United States Patent [19]

Daubenbüchel et al.

[11] Patent Number: 5,534,218
[45] Date of Patent: Jul. 9, 1996

[54] PROCESS FOR THE PRODUCTION OF A HOLLOW BODY OF THERMOPLASTIC MATERIAL

[75] Inventors: Werner Daubenbüchel, Bergisch-Gladbach; Alfred Jira, Königswinter, both of Germany

[73] Assignee: Krupp Kautex Maschinenbau GmbH, Bonn, Germany

[21] Appl. No.: 141,916

[22] Filed: Oct. 22, 1993

[30] Foreign Application Priority Data

Oct. 28, 1992 [DE] Germany ............ 42 36 439.6

[51] Int. Cl.⁶ ............................................. B29C 49/20
[52] U.S. Cl. ........................... 264/516; 264/515; 425/503
[58] Field of Search ............................ 264/511, 513, 264/515, 516; 425/503, 526; 156/309.9

[56] References Cited

U.S. PATENT DOCUMENTS

| | | | |
|---|---|---|---|
| 3,479,421 | 11/1969 | Armbruster et al. | 264/516 |
| 3,954,369 | 5/1976 | Körmendi | 405/326 |
| 4,305,416 | 12/1981 | Henning et al. | 137/38 |
| 4,323,411 | 4/1982 | Uhlig | 264/516 |
| 4,617,077 | 10/1986 | Giese et al. | 156/245 |
| 4,713,207 | 12/1987 | Udell et al. | 264/516 |
| 4,719,072 | 1/1988 | Kojima et al. | 264/515 |
| 4,872,935 | 10/1989 | Newkirk et al. | 156/309.9 |
| 4,959,190 | 9/1990 | Pfeiffer | 264/516 |
| 5,104,472 | 4/1992 | Kasugai et al. | 264/516 |
| 5,232,653 | 8/1993 | Addeo et al. | 264/515 |
| 5,240,536 | 8/1993 | Kurobe | 156/308.4 |

FOREIGN PATENT DOCUMENTS

| | | | |
|---|---|---|---|
| 0176044 | 4/1986 | European Pat. Off. | |
| 7235944 | 5/1974 | France | 264/516 |
| 0757045 | 8/1951 | Germany . | |
| 1852986 | 6/1962 | Germany . | |
| 2613735 | 10/1977 | Germany . | |
| 2936318 | 3/1981 | Germany . | |
| 3042926 | 3/1982 | Germany . | |
| 3223081 | 10/1983 | Germany . | |
| 3742993 | 11/1988 | Germany . | |
| 56-75832 | 6/1981 | Japan | 264/516 |
| 58-827741 | 5/1983 | Japan | 156/309.9 |
| 60-147320 | 8/1985 | Japan | 264/516 |
| 61-225027 | 10/1986 | Japan | 264/516 |
| 4091923 | 3/1992 | Japan | 264/516 |
| 4-14428 | 4/1992 | Japan . | |
| 5-16214 | 6/1993 | Japan . | |
| 5-92480 | 8/1993 | Japan . | |
| WO8000326 | 3/1980 | WIPO | 264/516 |

OTHER PUBLICATIONS

Patent Abstracts of Japan vol. 16, No. 94 (M–1219), 9. Mar. 1996 and JP–A–03 274 124.

*Primary Examiner*—Catherine Timm
*Attorney, Agent, or Firm*—Panitch Schwarze Jacobs & Nadel

[57] ABSTRACT

In a process for the production of a hollow body of thermoplastic material which is to include an additional portion, by expansion of a preform in a blow molding mold, the additional portion is connected to the hollow body upon expansion of the preform to form the hollow body. To form the connection between the hollow body and the additional portion, the latter is heated by a heating element which is brought into contact with at least the surface of the additional portion that is to involve the welded connection to the hollow body, prior to expansion of the preform. The heating element is brought into contact with the additional portion when already disposed in the blow molding mold in order in that way to heat at least the appropriate surface of the additional portion to a temperature which promotes the production of an adhesive join to the hollow body. The region of the additional portion that is to be heated is at least substantially covered relative to the outside atmosphere by the heating element.

17 Claims, 6 Drawing Sheets

FIG.1
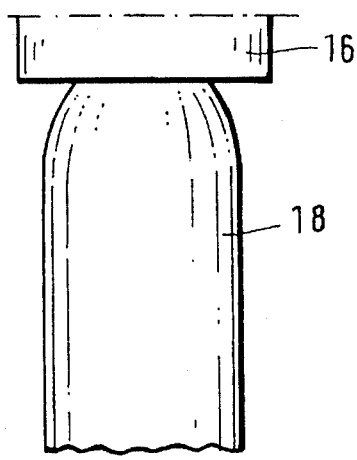
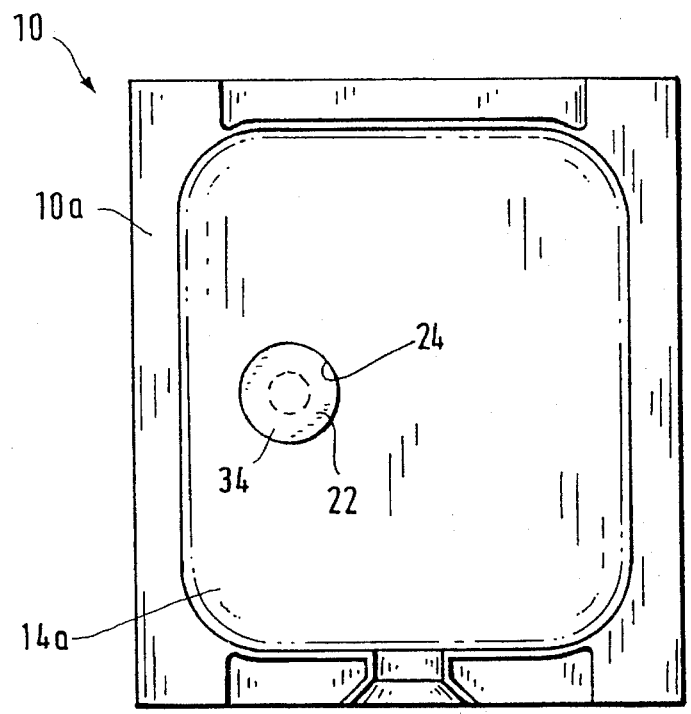
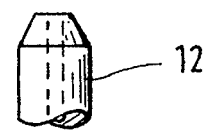

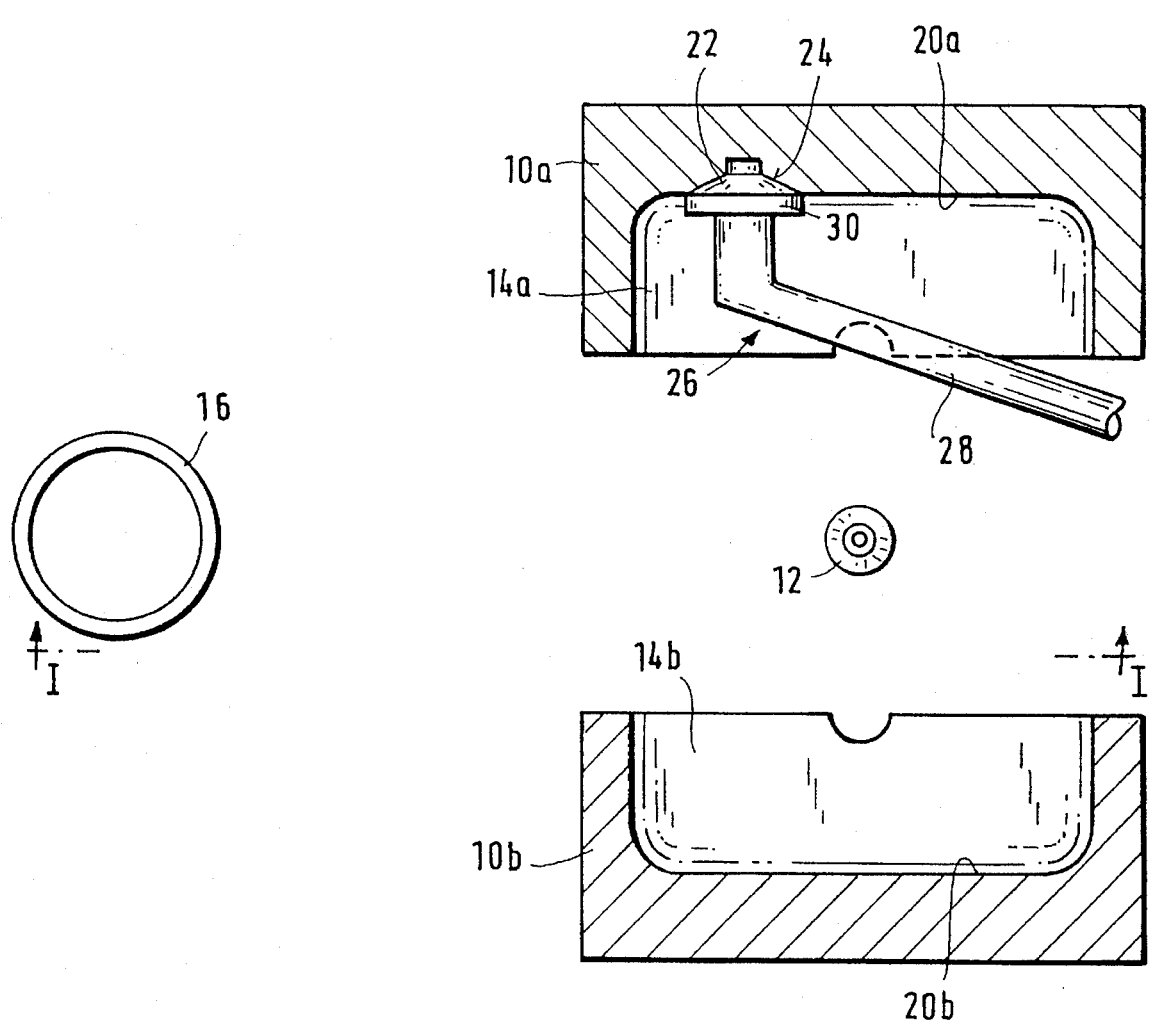

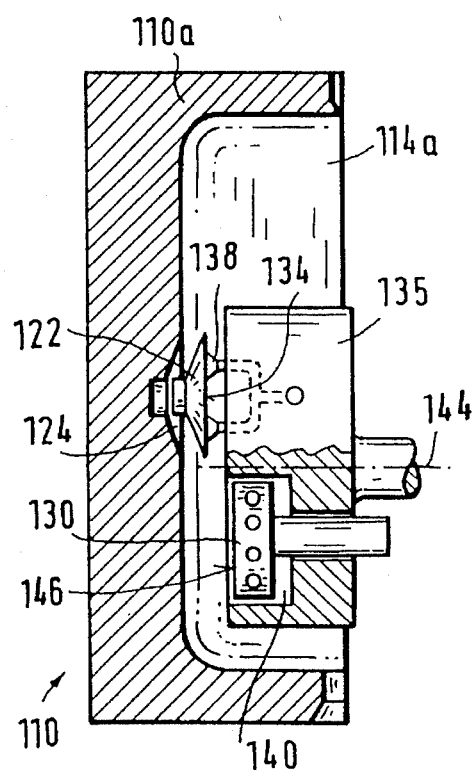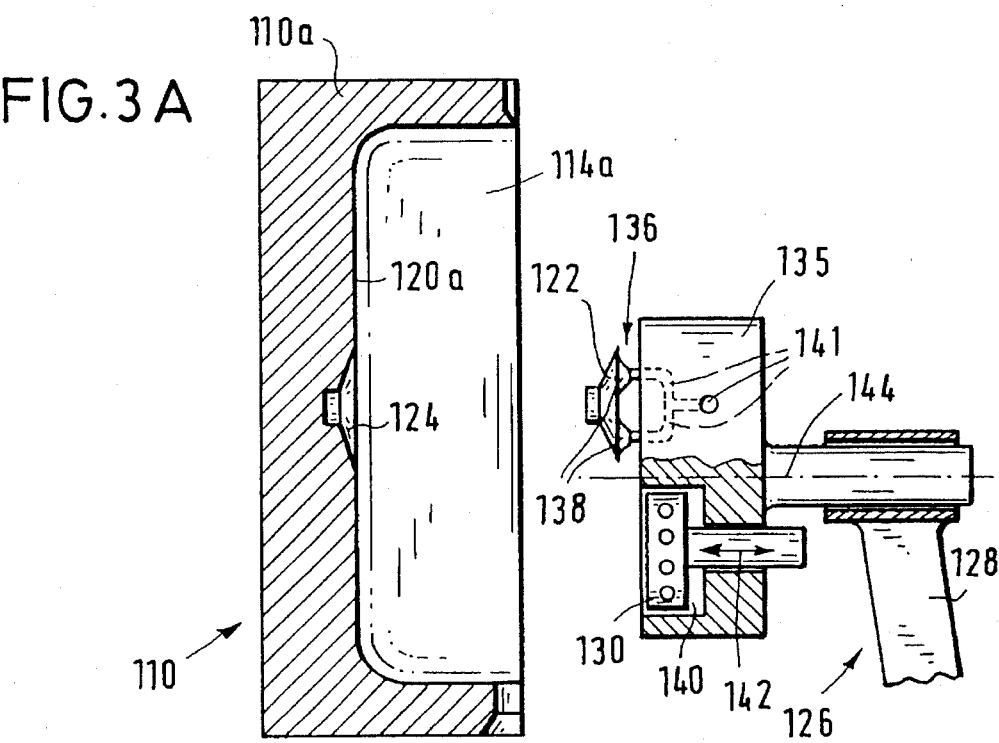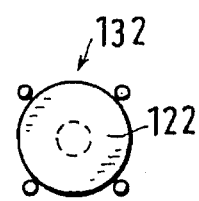
FIG. 3A
FIG. 3B

FIG. 3 E
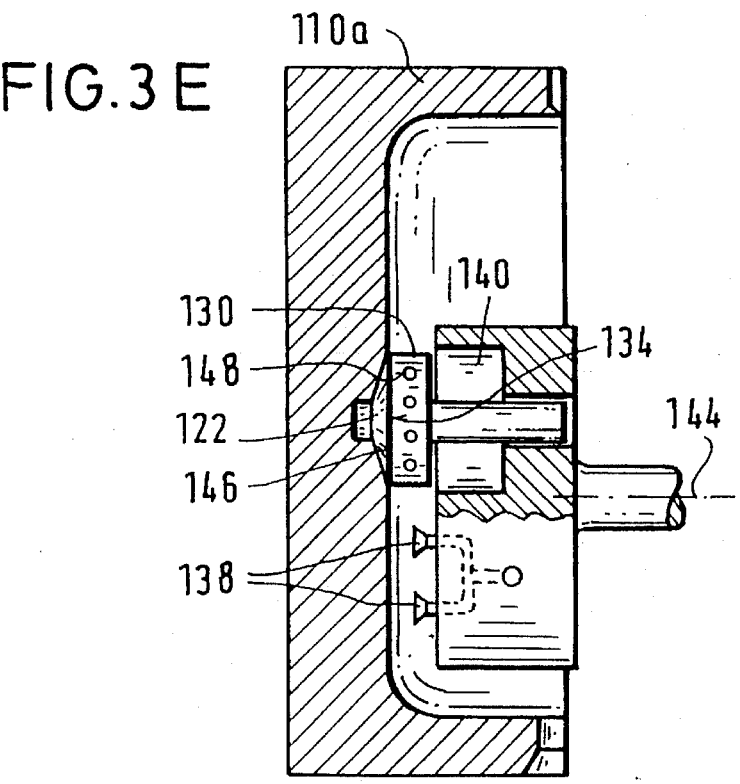
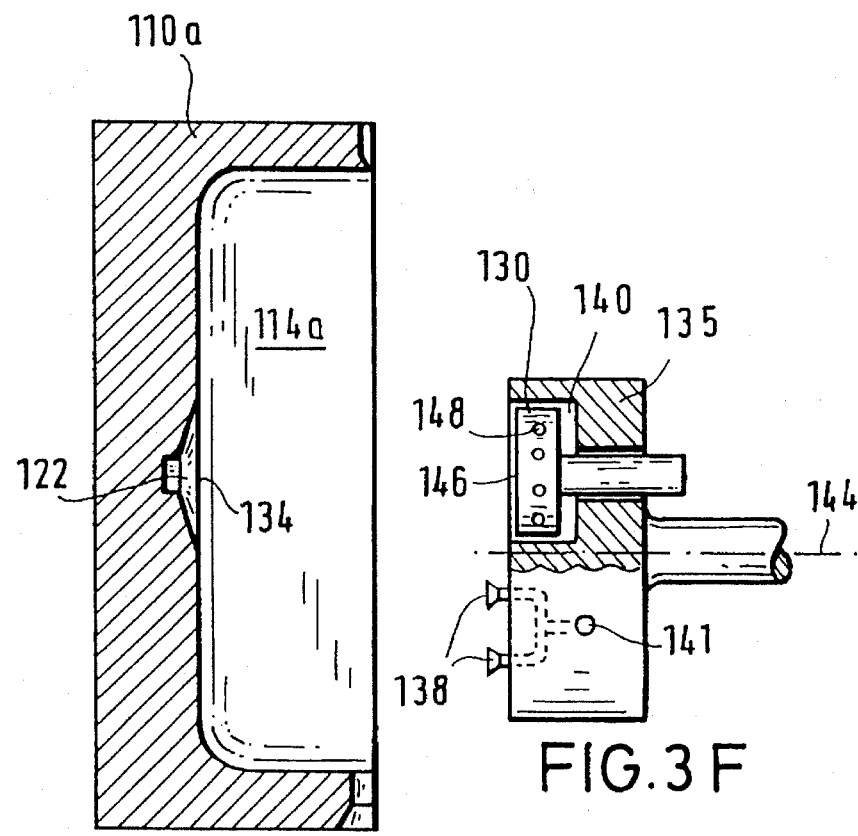
FIG. 3 F

PROCESS FOR THE PRODUCTION OF A HOLLOW BODY OF THERMOPLASTIC MATERIAL

BACKGROUND OF THE INVENTION

As a blow molding process for the production of a hollow body of thermoplastic material by expansion of a preform in a blow molding mold is subject to limitations in regard to the shape that can be imparted to the hollow body upon expansion of the preform in the blow molding mold to give the expanded hollow body, it has long been the practice for products which are of a complicated shape and configuration to be produced by a blow molding mold by means of a procedure wherein at least one separately produced additional portion is introduced into the blow molding mold before the latter is closed around the preform, whereupon in the subsequent expansion operation a connection is formed between the preform, or the hollow body which is formed therefrom in the course of expansion, and the additional portion in the mold, in such a way that parts of the surface of the additional portion are satisfactorily joined to a portion of the surface of the preform or the hollow body produced therefrom. In the majority of cases the preform and additional portion consist of the same plastic material so that, as the preform is in a hot-plastic condition in the expansion operation and is thus at a temperature which permits a welded joint to be formed between the preform and the additional portion, the additional portion can be secured to the hollow body by a welded joint in that way. In that respect, generally depending on the plastic material constituting the preform and the wall thickness thereof, a part of the thermal content of the preform is also used to raise the additional portion to a temperature which permits a good welded joint to be formed. In many situations in that respect the procedure adopted is such that the preform is formed at a temperature which is higher than that which would be required for the subsequent expansion operation in the blow molding mold and for the formation of welded seams to close the preform, in order in that way additionally to make available heat which, when contact occurs between the expanded preform and the additional portion, raises the latter at its contact surface to a temperature which is sufficiently high also to cause plasticization of the additional portion in the marginal layer which bears the contact surfaces. That mode of operation normally readily permits the attachment of prefabricated additional portions of that kind, for example consisting of polyethylene, to blow-molded bodies which also consist of polyethylene.

It is also possible for the additional portion to be preheated if the thermal content of the preform is not sufficient to bring about a satisfactory welding effect. In situations in which however preheating results in plasticization of the surfaces to be welded, handling of the additional portion when it is introduced into a suitable seat in which it is accommodated in the blow molding mold is made correspondingly difficult.

By way of indication, a hollow body with additional portions joined thereto is disclosed in German utility model No 1 852 986.

In the course of expansion of the use of the blow molding process, which has occurred in recent years, use is increasingly made of plastic materials which are more difficult to process, more specifically insofar as adding an additional portion to a hollow body in the above-described simple manner does not always result in the formation of welded joints of adequate strength. That can be attributed on the one hand to the fact that such plastic materials which for example may be thermoplastic elastomers require much closer temperature limits in the plasticization operation, that is to say when they are being processed in an extruder, so that there is no possibility of adopting a higher temperature for the preform in order in that way to provide the heat required to produce a sufficiently strong welded joint. Another problem which can arise in the case of plastic materials of that kind is that they have a tendency to suffer oxidation at their surfaces in the hot-plastic condition, thereby resulting in the formation at the surface of the material of a layer which makes it difficult or even impossible to provide a welded joint of adequate strength, even under conditions which in themselves are advantageous in respect of temperature, pressure and time. Admittedly, unless operation is carried out in an inert atmosphere, a certain degree of oxidation for example of the surfaces of a preform due to oxygen in the air can scarcely be avoided; however, as the degree of oxidation essentially depends on the time involved, the formation of an oxidation layer on the surfaces of the preform, such as to counteract the formation of a welded joint, can be avoided by carrying out the process in a suitable fashion, more specifically by producing the preform quickly. However, that is not always possible when the additional portion is to be preheated, unless the preheating operation is also effected in an inert atmosphere. In that situation, the difficulties already mentioned above in regard to handling an additional portion which has been preheated for plasticization thereof are also encountered. On the other hand however preheating of that kind will be necessary in those situations in which the amount of heat required to produce a welded joint can no longer be provided by the preform alone, in contrast to the above-described operating procedures. That will be the case in particular when the material forming the preform requires closer temperature limits to be observed, as already mentioned above.

SUMMARY OF THE INVENTION

An object of the present invention is to provide a process for the production of a hollow body of thermoplastic material with at least one additional portion connected thereto, wherein a prefabricated additional portion enjoys a welded joint of sufficient strength to the hollow body, even under disadvantageous conditions.

Another object of the present invention is to provide a process for the production of a hollow body of thermoplastic material, which is provided with at least one additional portion, wherein the additional portion and the hollow body are sufficiently strongly joined together irrespective of factors such as the thermal content of the preform from which the hollow body is produced by expansion, the nature and the configuration of the additional portion and the configuration of the blow molding mold.

Still another object of the present invention is a process for the production of hollow bodies of thermoplastic material, which have at least one additional portion joined thereto, which is adapted for use with a range of different plastic materials and which can be carried out in a procedure requiring the observance of very close temperature limits.

Yet another object of the present invention is to provide a process for producing a hollow body of thermoplastic material, which includes at least one additional portion, such that the inclusion of the additional portion does not cause any significant delay in carrying out the operating procedure for production of the hollow body.

A still further object of the present invention is to provide an apparatus for the production of a hollow body of thermoplastic material, including at least one additional portion connected thereto, which is of a simple design configuration while nonetheless providing a strong joint between the hollow body and the additional portion, without involving major complications in the operating procedure involved.

In accordance with the present invention the foregoing and other objects are achieved by a process for the production of a hollow body of thermoplastic material, which is provided with at least one additional portion, by expansion of a preform in a blow molding mold provided at its inside wall with a seat into which the additional portion is fitted. A region of the wall of the preform, or the hollow body produced therefrom by expansion, is pressed in the course of the expansion operation, while in a still hot-plastic state, against the additional portion and connected thereto by adhesion. At the latest at the moment in time at which the additional portion is fitted into the seat in the wall of the blow molding mold, at least a part of the surface of the additional portion, being the surface which involves a welded connection to the hollow body produced by expansion of the preform, is brought into contact with a heating element prior to complete expansion of the preform. The region of the additional portion which bears said surface is heated by the transmission of heat from the heating element to the additional portion, to a temperature which premotes the production of an adhesive connection between the additional portion and the hollow body. The region of the additional portion that is to be heated to said temperature is at least substantially covered relative to the external atmosphere by the heating element.

The use of a heating element which is brought into contact with the additional portion when already disposed in its seat in the blow molding mold affords the possibility of the direct transmission of heat from the heating element to that surface region of the additional portion, which is to be joined to the preform or the hollow body to be produced therefrom, by virtue of a strong adhesive connection which will normally be a welded connection, with that connection being formed under the effect of the blow molding pressure applied. In that respect the topography of the heating surface of the heating element and the contour thereof should be adapted to the topography and contour of the surface of the additional portion to be heated by the heating element, in order in that way to provide for optimum transmission of heat from the heating element to the additional portion. That gives the advantage on the one hand that heat is transmitted from the heating element essentially only to the surface of the additional portion, which is disposed in contact with the heating surface of the heating element. The regions of the inside wall surface of the blow molding mold, which are disposed around the additional portion, remain substantially unaffected by the heat output of the heating element, so that they do not experience a corresponding rise in temperature. That is advantageous for the reason that, after expansion of the preform to constitute the definitive configuration of the hollow body, the latter must be subjected to a cooling phase which results in solidification of the plastic material so that after adequate cooling the hollow body is self-supporting, in case that may be required. There is no need here to explain in further detail that the time required for the cooling phase has a quite considerable influence on the level of productivity of the blow molding installation. Increasing the temperature of parts of the wall of the blow molding mold, by virtue of heating the additional portion or by virtue of the use of heating elements employed for that purpose, for example when using heating radiating means, would result in an increase in the length of the cooling time and thus a drop in the level of productivity of the installation.

The direct contact between the heating surface of the heating element and the surface region of the additional portion, which is to be connected to the hollow body, also affords the advantage that the transmission of heat can be accurately metered and controlled in order to attain a given temperature, in order in that way to take account of the thermal properties of the material constituting the additional portion. It is thus possible for the final temperature of the region of the additional portion that is to be heated, and also the depth of that region, to be accurately adjusted by way of the temperature of the heating surface of the heating element and the duration of the heating operation. That aspect is important for the reason that, as already mentioned above, many cases require the maintenance of close temperature limits within which the desired effect, that is to say plasticization or softening of the surface region of the additional portion that is to be connected to the hollow body, occurs, in order to exclude influences which have an adverse effect on other properties of the material, for example due to an excessively high temperature or due to an excessively long heating period. As the degree of transmission of heat from the heating surface of the heating element to the additional portion essentially depends on the temperature of the heating surface and the time for which the heating element acts on the additional portion, it is thus readily possible to determine the condition of the additional portion at the end of the heat treatment by way of those two factors, namely temperature and time. In that respect, heating of the additional portion such as to produce a plasticization effect can remain limited to a layer, the plasticization of which is required to produce the desired connection between the hollow body and the additional portion.

A further advantage of the direct contact between the heating surface of the heating element and the region of the additional portion that is to be heated is that, particularly when the heating surface of the heating element is adapted to the contour and/or topography of the surface region of the additional portion, the latter is shielded relative to the surrounding atmosphere so that no oxidation of the surface region can occur in the course of the heating operation, as long as the heating surface of the heating element bears against that part of the surface of the additional portion. It will be appreciated that it is necessary for the heating element to be removed from the blow molding mold and thus from the additional portion before the blow molding mold, which is generally a two-part mold, is closed. During the period of time required for removal of the heating element and for closure of the two parts of the blow molding mold, the oxygen in the air can act on the heated surface of the additional portion. However that period of time is too short for an oxidation effect to be able to occur to a degree which could result in a noticeable influence on the surface of the additional portion, in the sense of impairing the adhesive or welded connection to be produced. Expansion of the preform within the closed blow molding mold is then effected so rapidly that the period of time required for that operation is in any case not significant. The endeavour therefore is to move the heating element away from the additional portion no earlier than is required for the normal operating procedure involved in the production process. In other words, if possible the heating element should be removed from the additional portion immediately prior to closure of the blow molding mold. On the other hand the procedure can be such that, immediately after the expanded and sufficiently solidified hollow body has been removed from the opened blow molding mold, the additional portion for the next working operation can be introduced into the blow molding mold and heating thereof can be begun. The heating time can last between 20 and more than 60 seconds depending on the size of the additional portion and the material from which it is made. The result of that can be that in many situations of use, it is also necessary for the cycle time for the production of a hollow body to be adapted to the time required for heating up the additional portion. That can mean that the cycle time must be increased by the time required for heating the additional portion.

As however for reasons of productivity the endeavour is that the time required for heating the additional portion should at least not noticeably exceed the period of time for which the blow molding mold is open in any case, it may be advantageous to use the time required for transporting the additional portion into the blow molding mold and into the seat provided therein for receiving the additional portion, for the operation of heating the additional portion. That can be achieved by the additional portion being held by a holder which is associated with the heating element, wherein the heating element and the holder are so associated with each other that, when an additional portion is carried by the holder, the heating element can already be brought into contact therewith and thus heats up the additional portion. It may be desirable also for the additional portion to be preheated outside the blow molding mold, without that already resulting in plasticization or some other modification in the nature of the additional portion, such as to make it more difficult to handle the additional portion. In other words, in the preheating operation, the temperature should not exceed a given upper temperature limit. However, even when the above-indicated conditions are met, the upper temperature limit will be so high that, by virtue of the preheating operation, the operation of heating the additional portion, which still has to be carried out in the blow molding mold to raise it to a temperature which guarantees the production of a good connection between the additional portion and the preform or hollow body, requires a period of time which is substantially shorter than would be the case if the additional portion had to be heated from the ambient temperature to the final temperature by the heating element, in the blow molding mold and possibly already during transportation of the additional portion. Accordingly the preheating step also serves to reduce if possible any adverse effect on the level of productivity of the blow molding mold. The preheating operation also affords the possibility of heating the additional portion in a careful and controlled manner, that is to say taking into consideration the properties of the material thereof, as overall there is more time available to achieve the final temperature required for producing a good welded connection.

Moreover, when dealing with more difficult materials such as thermoplastic elastomers (TPE), for example elastomer-modified polypropylene, it may be advantageous to provide a somewhat higher expansion pressure for expansion of the preform or subsequent cooling of the hollow body which is produced by expansion from the preform. Normally, an extrusion blow molding process operates with an internal blow molding pressure of between 8 and 10 bars. When using the process according to the invention it may be appropriate to operate with a pressure of more than 10 bars, for example between 14 and 15 bars, in order in that way to produce the welded connection under a higher pressure. The pressure with which the two components that are to be connected together are pressed against each other is a parameter which has a considerable influence on the quality of the welded connection produced, besides the temperature employed and the period of time for which the pressure is applied.

Further in accordance with the present invention the foregoing and other objects are achieved by apparatus for producing hollow bodies of thermoplastic material, provided with at least one additional portion, by an extrusion blow molding process, comprising a divided blow molding mold which serves for the expansion of a preform therein and which is internally provided with a seat for accommodating the additional portion. The apparatus includes a heating element having a heating surface adapted to be brought into contact with the additional portion, the heating element being reciprocatable between the additional portion disposed in its seat within the blow molding mold when open and a position which is outside the blow molding mold.

Further objects, features and advantages of the process and apparatus in accordance with the principles of the present invention will be apparent from the following description of preferred embodiments thereof.

BRIEF DESCRIPTION OF THE DRAWINGS

FIG. 1 is a diagrammatic view of an extrusion blow molding apparatus viewing in the direction of arrow I—I in FIG. 2, but without showing a heating means, FIG. 2 is a partly sectional plan view of the structure shown in FIG. 1, with the heating means, FIGS. 3A–F are views in longitudinal section through a blow molding mold portion with associated transportation and heating means in six successive phases of a working cycle.

DESCRIPTION OF PREFERRED EMBODIMENTS

Figure 3C:
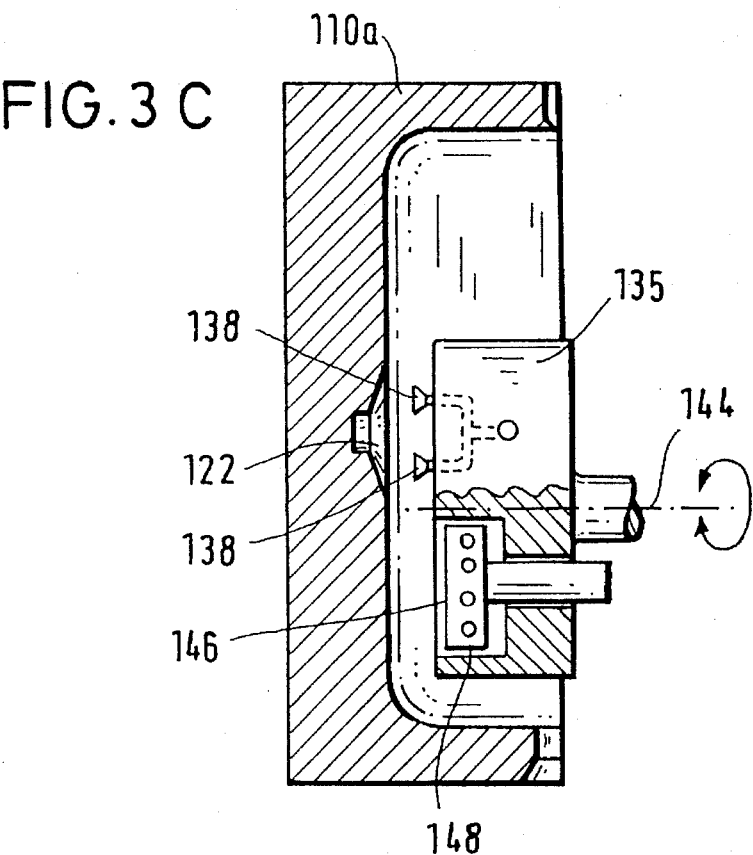

Referring firstly to FIGS. 1 and 2, shown therein is a blow molding mold 10 which is subdivided in the usual fashion into first and second mold halves or portions as indicated at 10a and 10b and which co-operates with a blowing mandrel or nozzle pipe 12 for supplying the pressure medium for expansion of a preform within the blow molding mold. FIGS. 1 and 2 show the blow molding mold 10 in an open condition, in which therefore the two mold portions 10a and 10b are moved away from each other and permit access to the mold cavity which, similarly to the way in which the mold 10 is divided into the two mold portions 10a, 10b, is divided into two cavity halves 14a and 14b.

The extrusion blow molding apparatus further has at least one extruder including an extrusion head as diagrammatically indicated at 16 from which preforms as indicated at 18 are extruded continuously or in a batch-wise fashion. This arrangement involves equipment and operating procedures which are well known and conventional practice and therefore do not need to be described in greater detail herein, so that the drawing only diagrammatically shows the extrusion head 16 which has a discharge opening for the preforms 18.

In the embodiment shown in FIGS. 1 and 2 the mold 10 is disposed at a spacing from the extrusion head 16 laterally beside same. If the mold 10 is stationary the distance between the extrusion head 16 and the mold 10 can be bridged by a gripper device (not shown) which removes the respective extruded preform 18 from the extrusion head 16 and transports it into the mold 10 when the latter is in the open condition. It is however also possible for the mold 10 to be arranged reciprocatably between a position beneath the extrusion head 16 and the position shown in FIGS. 1 and 2. That arrangement also involves known items of equipment and procedures which are conventional practice in this respect and which therefore do not need to be described in further detail herein.

In the following description of the operating procedure involved in the course of a working cycle, it will be assumed that the preform 18, as soon as it has reached the necessary length required for the production of a hollow body therefrom, is transported by a gripper device into the open, stationary mold 10. After the preform 18 when held by the gripper device has reached its position within the open mold 10, the blowing mandrel or nozzle pipe 12 is moved into the lower open end portion of the preform 18 disposed within the mold. Thereupon the mold 10 is closed around the preform 18 by the two mold portions 10a and 10b being moved together. After that, blowing air is introduced under an increased pressure through the blowing mandrel or nozzle pipe 12 into the preform 18 to expand same until it bears against the inside surface of the wall 20a, 20b of the mold cavity 14a, 14b. After a period of time which is required for cooling of the hollow body produced from the preform 18 by expansion in that way, the mold 10 is opened for removal of the hollow body after sufficient solidification thereof from the mold 10. FIGS. 1 and 2 show the mold 10 in a phase within the working cycle immediately after removal of the expanded hollow body from the mold 10.

The hollow body to be produced in the mold 10 is to be provided with a prefabricated additional portion 22 which is to be attached on the outside to the wall of the hollow body by a welded joint or connection. For that purpose, provided in the wall 20a of the mold portion 10a is a recess or opening as indicated at 24, the configuration of which is adapted to that of the additional portion 22 and forms a seat for accommodating the additional portion 22.

The procedure for attaching the additional portion 22 to the preform or the hollow body is such that, at the end of a working cycle, after the hollow body produced therein has been removed from the mold 10, an additional portion 22 is fitted into the seat 24. That operation can be carried out manually or by a suitable transportation device which is not shown but which can be of any appropriate configuration for that purpose. Thereafter the additional portion 22 which has possibly been preheated outside the mold 10 and which is now disposed in the seat 24 is brought into contact with a heating element 30, at the accessible end surface 34 of the additional portion 22. The heating element 30 is part of a device which is generally indicated at 26 in FIG. 2 and which includes an arm 28 carrying the heating element. The device 26 is reciprocatable between a first position in which the heating element 30 bears against the additional portion 22 disposed in the seat 24, and a second position in which the device 26 is disposed outside the region of movement of the mold portions 10a and 10b in the closing movement thereof.

In the first position of the heating element 30 as shown in FIG. 2, heat is transmitted from the hot heating element 30 to the additional portion 24, more specifically and in particular to the end boundary surface 34 thereof which, when the additional portion 22 is disposed in the seat 24, faces towards the mold cavity 14a, 14b. In the configuration of the parts shown in FIGS. 1 and 2, the surface 34 of the additional portion 22 is aligned with the inside wall surface 20a of the mold cavity 14a, 14b and thus forms a portion of the wall surface defining the mold cavity 14a, 14b. The period of time for which the heating element 30 remains in contact with the surface 34 of the additional portion 22 depends on the degree of heating of the region of the additional portion 22 having the surface 34, that is required to produce a sufficiently strong welded connection to the hollow body to be produced from a preform in the following working cycle. The region of the end face of the heating element 30, which is in contact with the end surface 34 of the additional portion 22, simultaneously covers over that surface 34 so that the surface is protected from oxygen in the air having access thereto. After the temperature required for producing the desired welded connection has been reached, the device 26 with the heating element 30 is moved away from the additional portion 22 disposed in the seat 24 and thus moved out of the blow molding mold 10. Thereafter the mold 10 can be closed. In that respect it is assumed that prior to the blow molding mold being closed, a preform 18 had been introduced into the mold 10 while still in the opened condition, by a gripper device, in the manner already described above.

FIG. 2 of the drawing shows that, in dependence on the position of the seat 24 and thus the position of the device 26 when heating the additional portion 22, it will be possible in many cases for the preform 18 to be introduced into the mold 10 without that operation being impeded by the device 26 which at that time is still disposed within the opened mold 10.

When the installation involves the use of a blow molding mold which is reciprocatable between the position shown in FIGS. 1 and 2, and a position beneath the extrusion head 16 for receiving the preform 18 therefrom, then, after the device 26 has been moved out of the mold in the opened condition, the mold with the additional portion 22 therein would be moved into the position beneath the extrusion head 16 in order there to receive the preform which has been extruded in the meantime, for the next following working cycle. In that situation the device 26 can possibly follow the mold when it performs that movement, in order thereby to make use of the time required for performing that movement, for also heating the additional portion, while also shielding the heated surface thereof from the oxygen in the surrounding air.

In the subsequent step of expansion of the preform 18 to form the hollow body, the wall thereof is pressed under the effect of the internal blow molding pressure against the surface 34 of the additional portion, being the surface 34 which is towards the preform 18 as it expands. In that situation, because the preform or the hollow body formed therefrom is still in a hot-plastic condition at that time, and that is also the seine for the region of the additional portion which has the surface 34, by virtue of the preceding heating thereof, a welded connection is formed between the additional portion 22 and the wall region of the hollow body which comes to bear against the surface 34 of the additional portion. That welded connection is of such a strength and durability that it can satisfy any practical requirements. It will be noted that the heating operation which can be precisely adjusted in regard to temperature, time and region of the heating effect can at least substantially eliminate the disadvantages of the prior processes of this kind, and in addition makes it possible to take account of the requirements of the respective material constituting the additional portion, in particular in regard to temperature level and heating time. After the above-mentioned welded connection has been formed, the additional portion is thus a component of the hollow body and is removed from the seat 24 when the hollow body is withdrawn from the blow molding mold.

Reference will now be made to FIGS. 3A through 3F showing an embodiment of the process and apparatus of the present invention and in which components corresponding to those appearing in FIGS. 1 and 2 are denoted by the same reference numerals but increased by 100. In this embodiment the device 126 constituting the heating element for heating the additional portion 122 while also at least substantially covering the region thereof that is to be heated relative to the outside atmosphere also serves at the same time to transport the additional portion 122 from a station outside the blow molding mold 110, being a station in which it is possibly preheated, into the seat 124 provided for receiving the additional portion 122 in the mold 110. For that purpose the device 126 is provided with a head 135 which is mounted pivotably on a carrier arm 128 and which has a holder 136 for the additional portion 122 and a heating element 130. In this embodiment the holder 136 comprises first and second suction cups 138 which can be connected to a reduced-pressure source by way of conduits 141.

The heating element 130 is arranged within a recess 140 within the head 135, in such a way that the heating element 130 can be reciprocated in the direction indicated by the double-headed arrow 142. The drive means required for producing that movement are not shown in the drawing for the sake of simplicity thereof. The head 135 is mounted on the arm 128 pivotably about the axis indicated at 144.

During the performance of a working cycle, the device 126 takes an additional portion 122 for the following working cycle from a magazine indicated at 132 in FIG. 3A, which can contain a supply of such additional portions 122. It is possible for the additional portion 122 to undergo preheating in the magazine 132 which, as illustrated, is disposed in the vicinity of the blow molding mold 110 but obviously outside same. However, it will be noted that the preheating of the additional portion 122 should not result in plasticization or other modification in the properties of the additional portion 122, which would have an adverse effect on handleability thereof.

Figure 3D:
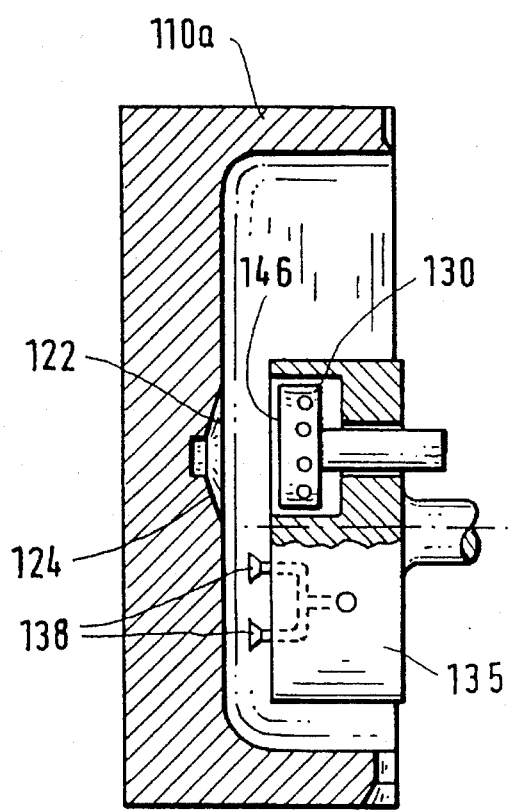

As soon as the mold 110 is opened and the hollow body previously produced therein has been removed, the device 126 is moved into the open mold 110 in such a way that firstly the additional portion 122 carried by the head 135 is disposed opposite the seat 124 provided in the internal wall 120a of the mold portion 110a. That intermediate position is the position of the apparatus that is shown in FIG. 3A. In the subsequent, substantially linear movement of the device 126 towards the left in FIG. 3A, the additional portion 122 is inserted into the seat 124. FIG. 3B shows the components in a position immediately prior to the additional portion 122 attaining its final position of being accommodated in the seat 124. As soon as the additional portion 122 is disposed in the seat 124, the reduced pressure acting on the additional portion 122 by way of the conduits 141 to hold it to the holder 135 is cut off so that the additional portion 122 is released and the head 135 can thus be retracted into the position shown in FIG. 3C without the additional portion 122 being withdrawn from the seat 124. Thereafter the head 135 is pivoted about the axis 144 into the position which is shown in FIG. 3D and in which the heating element 130 is disposed in opposite relationship to and at a spacing from the additional portion 122 disposed in the seat 124. The heating element 130 is then displaced linearly from the position shown in FIG. 3D into the position shown in FIG. 3E in which the end face 146 of the heating element 130 bears against the end face 134 of the additional portion 122 which is disposed in the seat 124. The heating effect for the heating element 130 is provided by way of heating wires which are indicated at 148 in FIG. 3E. It will be noted that the region of the additional portion that is to be heated to the temperature which promotes the production of the adhering or welded connection between the additional portion 122 and the hollow body to which it is to be attached is at least substantially covered relative to the external atmosphere by the heating element 130. After a sufficient heating time the heating element 130 is retracted into the recess 140 in the head 135. Simultaneously therewith, the apparatus can also begin the movement of the device 126 by means of which the device 126 is moved out of the region of movement of the two portions of the mold 110. FIG. 3F shows the heating element 130 in its retracted position.

After the device 126 has been moved out of the region of movement of the mold portions, but possibly also at an earlier stage in the operating procedure, the preform can be introduced into the mold 110 in the manner already described above with reference to FIGS. 1 and 2, and the mold 110 can then be closed by the two mold portions being moved together, for production of the following hollow body by expansion of the preform within the closed mold. In that operation the heated additional portion 122 is connected to the hollow body as it is formed by expansion from the preform 110, in the manner already described above.

Figure 4:
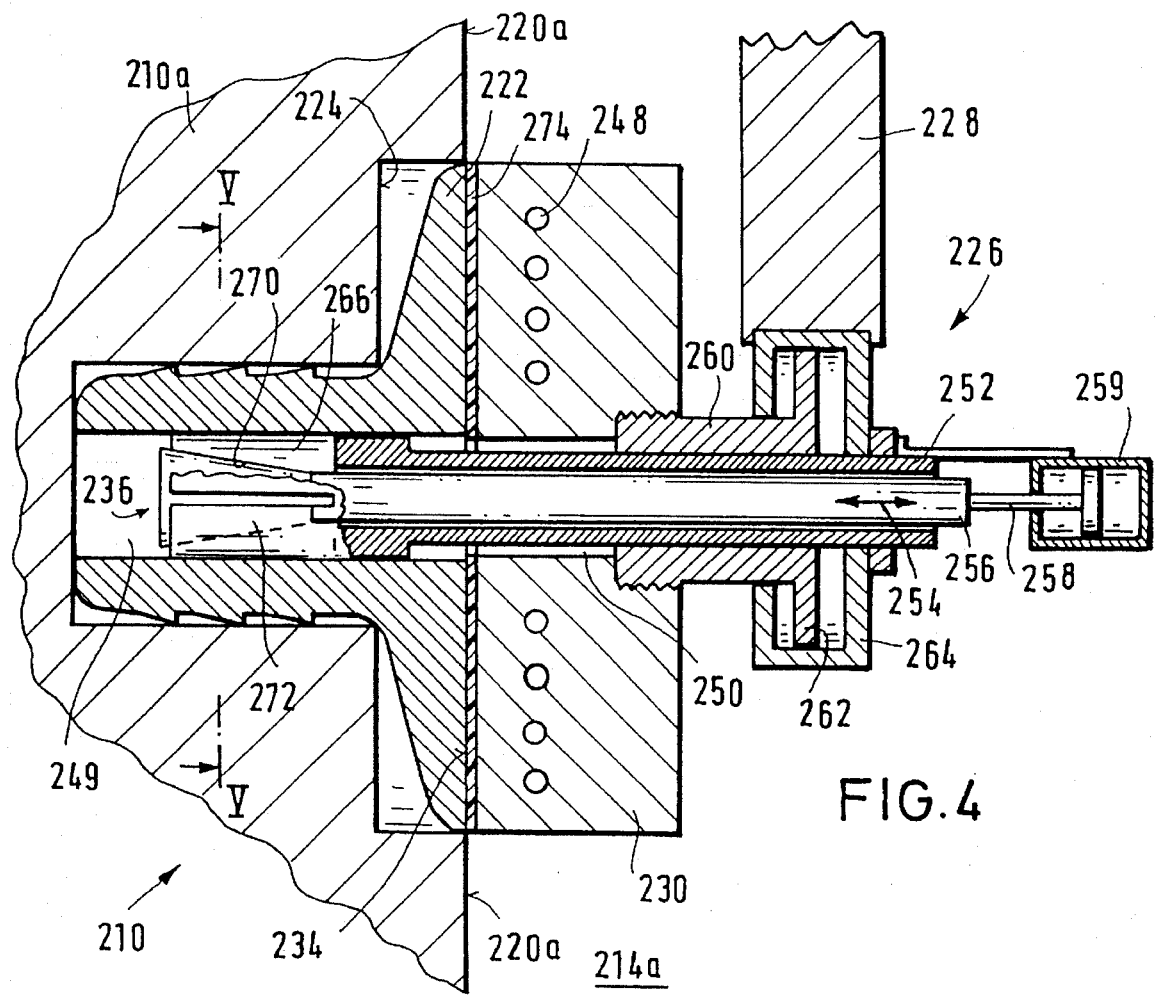
FIG. 4 shows a part of a blow molding mold portion with associated heating and transportation means on a larger scale.
Figure 5:
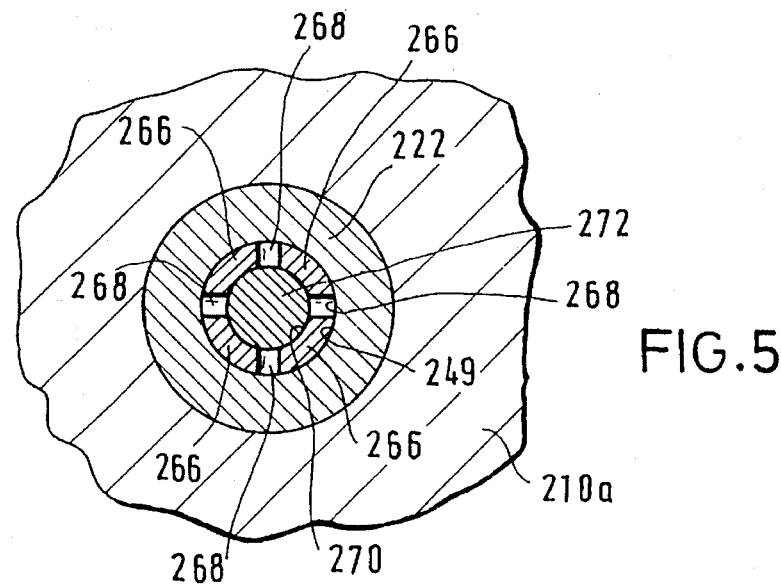
FIG. 5 is a view in section taken along line V—V in FIG. 4.

Referring now to FIGS. 4 and 5, components therein which correspond to those of the embodiment shown in FIGS. 1 and 2 are denoted by the same reference numerals but increased by 200.

The general configuration of the apparatus of which only part is shown in FIGS. 4 and 5 is substantially the same as that of the embodiment shown in FIGS. 3A through 3F, but with the difference that in the embodiment of FIGS. 4 and 5 the holder arrangement 236 by means of which the additional portion 222 is inserted into the seat 224 in the wall 220a of the blow molding mold 210 is of a completely different configuration. That is also related to the configuration of the additional portion 222 which in this embodiment is a nipple member, that is to say a hollow member with a passage 249 extending therethrough. That configuration of the additional portion 222 affords the possibility that the holding arrangement 236 can engage into the passage 249 in the additional portion 222, for holding the additional portion 222 for transportation thereof from for example a supply magazine, corresponding to the magazine 132 shown in FIG. 3A, into the seat 224. The holding arrangement 236 can be in the form of a clamping mandrel member which can thus extend into the passage 249. For that purpose, the heating element 230 is provided with a through bore 250 through which the clamping mandrel member extends. The clamping mandrel member comprises a hollow pin 252, and an actuating pin 256 which is guided within the hollow pin 252 reciprocatably in the direction indicated by the double-headed arrow 254. The actuating pin 256 is connected to a piston rod 258 of a piston-cylinder unit 259 which is carried by the hollow pin member 252.

The heating element 230 is carried by a sleeve 260 which is screwed into a portion of larger diameter of the bore 250 in the heating element 230, and at its end remote from the heating element 230 is provided with a piston 262 which is arranged slidably within a cylinder 264. The cylinder 264 is carried by an arm 228 of the device 226. The hollow pin member 252 is mounted within the sleeve 260. At its end remote from the piston-cylinder unit 259, the hollow pin member 252 carries a plurality of, for example as illustrated four, extension portions 266 forming a sleeve configuration which is provided with longitudinally extending slots indicated at 268 in FIG. 5. The internal peripheral surface 270 of the sleeve configuration extends conically in such a way that its diameter increases towards the free end of the sleeve configuration. At its end remote from the piston-cylinder unit 259, the actuating pin member 256 within the hollow pin member 252 is provided with a conical portion 272 whose diameter increases in the same direction as the inside diameter of the internal peripheral surface defined by the extension portions 266. The conical portion 272 is arranged within the extension portions 266 or the slotted sleeve configuration formed thereby.

At its side which is towards the surface 234 of the additional portion 222, the heating element 230 is provided with a contact means or coating layer 274 of a material which prevents the additional portion 222 from sticking to the heating element 230 when the surface 234 of the additional portion 222 is in a plasticized condition by virtue of being heated by the heating element 230. The material constituting the contact means or coating layer 274 is any suitable material such as fiber glass material, silicone, Teflon (trade name for polytetrafluoroethene) and the like. It will be noted at this point that the heating element in the above-described embodiments may normally also be provided with such a contact means or coating layer.

The embodiment shown in FIGS. 4 and 5 is used in an operating procedure such that firstly the unit comprising the heating element 230, the clamping sleeve configuration with hollow pin member 252 and actuating piston 256 with associated components and operating means is brought into the vicinity of a supply magazine and/or a station in which the respective additional portion 222 can undergo preheating. There the clamping mandrel member of the holder arrangement 236 is firstly introduced into the passage 249 through the additional portion 222, until the surface of the heating element 230, which is disposed opposite the additional portion 222, bears against the face 234 of the additional portion 222.

At the moment at which the clamping mandrel member is introduced into the passage 249, the actuating piston 256, with respect to the view shown in FIG. 4, assumes its left-hand limit position in which the extension portions 266 are not spread radially outwardly. In that case the sleeve configuration defined by the extension portions 266 is of an outside diameter which is smaller than the inside diameter of the passage 249 in the additional portion 222. As soon as those components assume their correct position relative to the additional portion 222, the slotted sleeve configuration formed by the extension portions 266 is spread radially outwardly by corresponding displacement of the conical portion 272 on the actuating pin member 256, towards the right in FIG. 4. That is effected by suitable actuation of the piston-cylinder unit 259. The additional portion 222 is now firmly carried on the slotted sleeve configuration defined by the extension portions 266. As, at that time, the heating element 230 or the outside surface of the contact means or coating layer 274 thereon is already in a position of bearing against the surface 234 of the additional portion 222, it is already possible, during the following transportation operation, to begin the operation of heating the additional portion 222 or the operation of further heating the additional portion if it has already been subjected to a preheating step outside the mold 210. By suitable movement of the arm 228, the additional portion 222 is then moved into its position in the seat 224, being therefore the position shown in FIG. 4. In general it will be possible immediately thereafter to release the connection between the slotted sleeve configuration 266 and the additional portion 222, by suitable displacement of the conical portion 272 towards the left with respect to FIG. 4. As a result, after the necessary residence time during which the heating element 230 is in heating contact with the additional portion 222, the heating element 230 is brought out of contact with the face 234 of the additional portion 222, by suitable actuation of the piston 262 in the cylinder 264. It is then further possible, by suitable movement of the arm 228, to draw the clamping mandrel member out of the passage 249 in the additional portion 222 and to remove the entire device 226 from the region of movement of the mold portions so that thereafter, as soon as the preform (not shown) has assumed its definitive position within the mold 210, the mold 210 can be closed and the preform can then be expanded by internal pressure until it bears against the wall surface 220a of the mold 210 and against the surface 2234 of the additional portion 222, whereby the preform is adheringly connected to the additional portion 222.

It will be seen therefore that, at the latest at the time at which the additional portion is fitted into its seat in the internal wall surface of the blow molding mold, prior to complete expansion of the preform, the heating element is brought into contact with the additional portion at at least a part of the additional portion surface which is involved in the connection to the hollow body produced by expansion of the preform, so that the region of the additional portion having said surface is heated by the transmission of heat from the heating element, to a temperature such as to promote the production of the connection between the additional portion and the hollow body. As indicated above, the region of the additional portion that is to be heated to the above-mentioned temperature is at least substantially covered relative to the ambient atmosphere, by the heating element itself.

In addition the surface of the heating element which is operable to provide for the transmission of heat to the additional portion 22, 122 or 222 is adapted or matched to the surface, which co-operates therewith, of the additional portion. The heating surface of the heating element is also adapted or matched to the contours of the surface region of the additional portion, which is to be connected to the hollow body produced from the preform by expansion of the preform in the mold. Thus, while the co-operating surfaces of the embodiments illustrated in the drawing are at least substantially flat surfaces, the surface of the additional portion which is to be brought into contact with the heating surface of the heating element may be curved, provided with steps or of an irregular configuration in some other way. It will be appreciated that the heating surface of the heating element is then to conform to that surface configuration.

The blow molding mold and the additional portion may comprise a thermoplastic elastomer material.

It will be appreciated that the above-described processes and apparatuses according to the invention have been set forth solely by way of example and illustration of the principles of the present invention and that various modifications and alterations may be made therein without thereby departing from the spirit and scope of the present invention.

What is claimed is:

1. In a process for the production of a hollow body of thermoplastic material, which includes at least one additional portion, comprising the steps of: introducing a preform into an open divided blow molding mold which is provided at its inside wall with a seat into which the additional portion is fitted and seated; closing the divided mold; expanding the preform in the closed mold to provide the hollow body; and pressing a region of the wall of the preform in the course of the expansion operation in a still hot-plastic state against the additional portion to form an adhering connection between the additional portion and the hollow body, the improvement comprising prior to completing the step of expanding the preform, the steps of heating at least a part of a surface of the additional portion with a heating element while the additional portion is in the mold, said part of the surface to be connected to the hollow body produced by expansion of the preform, by the transmission of heat from the heating element to the part of the surface of the additional portion to raise the part of the surface to a temperature effective to form the adhering connection between the additional portion and the hollow body, while simultaneously effectively covering the part of the surface from exposure to the outside atmosphere in the open mold with the heating element.

2. A process as set forth in claim 1 wherein the heating and covering step continues while the additional part is being fitted and seated in the seat.

3. A process as set forth in claim 1 further comprising the step of using one means supporting the additional portion and the heating element to introduce the additional portion into the open mold and to fit and seat the additional portion while the heating means simultaneously performs the heating and covering step.

4. In a process for the production of a hollow body of thermoplastic material, which includes at least one additional portion, comprising the steps of: introducing a preform into an open divided blow molding mold which is provided at its inside wall with a seat into which the additional portion is fitted and seated; closing the divided mold; expanding the preform in the closed mold to provide the hollow body; and pressing a region of the wall of the preform in the course of the expansion operation in a still hot-plastic state against the additional portion to form an adhering connection between the additional portion and the hollow body, the improvement comprising prior to completing the step of expanding the preform, the steps of heating at least a part of a surface of the additional portion seated in the mold with a heating element, said part of the surface to be connected to the hollow body produced by expansion of the preform, by the transmission of heat from the heating element to the part of the surface of the additional portion to raise the part of the surface to a temperature effective to form the adhering connection between the additional portion and the hollow body, while simultaneously effectively covering the part of the surface being heated from exposure to the outside atmosphere in the open mold with the heating element.

5. A process as set forth in claim 4 further comprising the step of introducing the heating element and said additional portion to be connected to said preform in the mold into the mold by the same means, the means being movable into and out of the mold when the mold is in an open condition.

6. A process as set forth in claim 5 wherein heating of the additional portion begins during transportion of the additional portion into the mold.

7. A process as set forth in claim 4 comprising using separate means for introducing the additional portion into the seat in the mold and for introducing into the mold the heating element for heating the additional portion to the temperature which is suitable for producing said connection.

8. A process as set forth in claim 4 in which the step of bringing a heating element into contact comprises contacting the part of the surface with a heating element having a heat transmission surface at least generally conforming to the contour of the part of the surface of the additional portion being heated.

9. A process as set forth in claim 4 including the steps of holding the heating element in a position effectively covering said part of the surface of the additional portion and thereafter removing the heating element from the open mold prior to closing the mold.

10. A process as set forth in claim 4 wherein the covering step comprises contacting the part of the surface with a part of the heating element covered with a material which prevents the part of the surface contacted by the heating element from adhering to the heating element.

11. A process as set forth in claim 4 further comprising before the additional portion is introduced into the mold, the step of preheating said additional portion to a temperature below which the material of the additional portion undergoes plasticization.

12. A process as set forth in claim 4 wherein the step of introducing the preform comprises introducing the preform into the mold in a hot condition in which the preform is initially produced.

13. A process as set forth in claim 4 wherein the blow molding pressure is over 10 bars during expansion of the preform.

14. A process as set forth in claim 4 wherein the blow molding pressure is over 10 bars after expansion of the preform at least during a part of the hollow body cooling phase.

15. A process as set forth in claim 13 wherein said pressure is between 14 and 15 bars.

16. A process as set forth in claim 14 wherein said pressure is between 14 and 15 bars.

17. A process as set forth in claim 4 wherein the preform and the additional portion each comprise thermoplastic elastomer.

* * * * *